US008849650B2

(12) United States Patent
Gopi

(10) Patent No.: US 8,849,650 B2
(45) Date of Patent: Sep. 30, 2014

(54) SYSTEM AND METHOD FOR AUTOMATICALLY GENERATING SENTENCES OF A LANGUAGE

(75) Inventor: Kumar Bulusu Gopi, Visakhapatnam (IN)

(73) Assignee: Sankhya Technologies Private Limited, Jayalakshmipuram, Nungambakkam, Chennai (IN)

( * ) Notice: Subject to any disclaimer, the term of this patent is extended or adjusted under 35 U.S.C. 154(b) by 808 days.

(21) Appl. No.: 13/125,428

(22) PCT Filed: Oct. 22, 2008

(86) PCT No.: PCT/IN2008/000699
§ 371 (c)(1),
(2), (4) Date: Jul. 7, 2011

(87) PCT Pub. No.: WO2010/046902
PCT Pub. Date: Apr. 29, 2010

(65) Prior Publication Data
US 2011/0257962 A1   Oct. 20, 2011

(51) Int. Cl.
*G10L 15/00* (2013.01)
(52) U.S. Cl.
USPC ............................................. 704/9; 704/257
(58) Field of Classification Search
USPC ............................................................ 704/9
See application file for complete search history.

(56) References Cited

U.S. PATENT DOCUMENTS

| 6,243,669 | B1 | 6/2001 | Horiguchi et al. | |
| 6,697,793 | B2 | 2/2004 | McGreevy | |
| 6,778,949 | B2 | 8/2004 | Duan et al. | |
| 7,003,445 | B2 | 2/2006 | Humphreys et al. | |
| 7,184,950 | B2 | 2/2007 | Weise | |
| 7,231,341 | B2 | 6/2007 | Bangalore et al. | |
| 7,324,936 | B2 | 1/2008 | Saldanha et al. | |
| 7,349,840 | B2 | 3/2008 | Budzinski | |
| 7,526,424 | B2 * | 4/2009 | Corston-Oliver et al. | 704/9 |
| 7,593,843 | B2 * | 9/2009 | Aue et al. | 704/2 |
| 7,734,459 | B2 * | 6/2010 | Menezes et al. | 704/5 |
| 8,527,262 | B2 * | 9/2013 | Kambhatla et al. | 704/9 |

OTHER PUBLICATIONS

International Search Report and Written Opinion; PCT/IN08/00699; LW Young; May 28, 2009.

* cited by examiner

*Primary Examiner* — Daniel D Abebe
(74) *Attorney, Agent, or Firm* — Fish & Richardson P.C.

(57) ABSTRACT

A system and method for automatically generating sentences in a language is disclosed. The system comprising a grammar processor for converting an input grammar into a hierarchical representation, and a grammar explorer module for traversing the grammar hierarchy based on an explore specification, which defines what nodes of the hierarchy should be explored. The explorer module takes the exploration specification as input and traverses the hierarchy according to the exploration types specified in the exploration specification. The system and method can be used to automatically generate assembly instructions for a microprocessor given its assembly language grammar, to generate sentences of a natural language like English from its grammar and to generate programs in a high-level programming language like C.

11 Claims, 9 Drawing Sheets

FIG. 3A
```
P1: ADD_INSN -> add REG REG REG
P2: REG -> r0
P3: REG -> r1
P4: REG -> r2
```
FIG. 3B
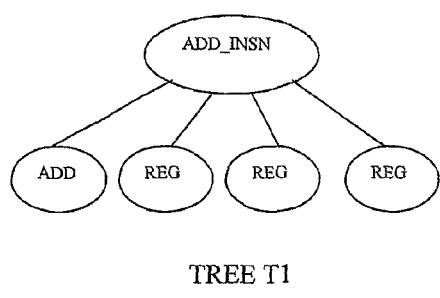
TREE T1
FIG. 3C
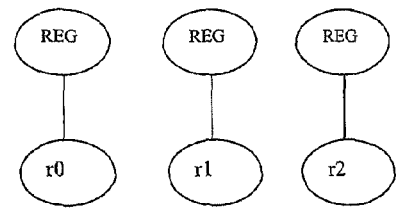
TREE T2  TREE T3  TREE T4

FIG. 4

```
explore ADD_INSN all
explore REG r0,r1
```

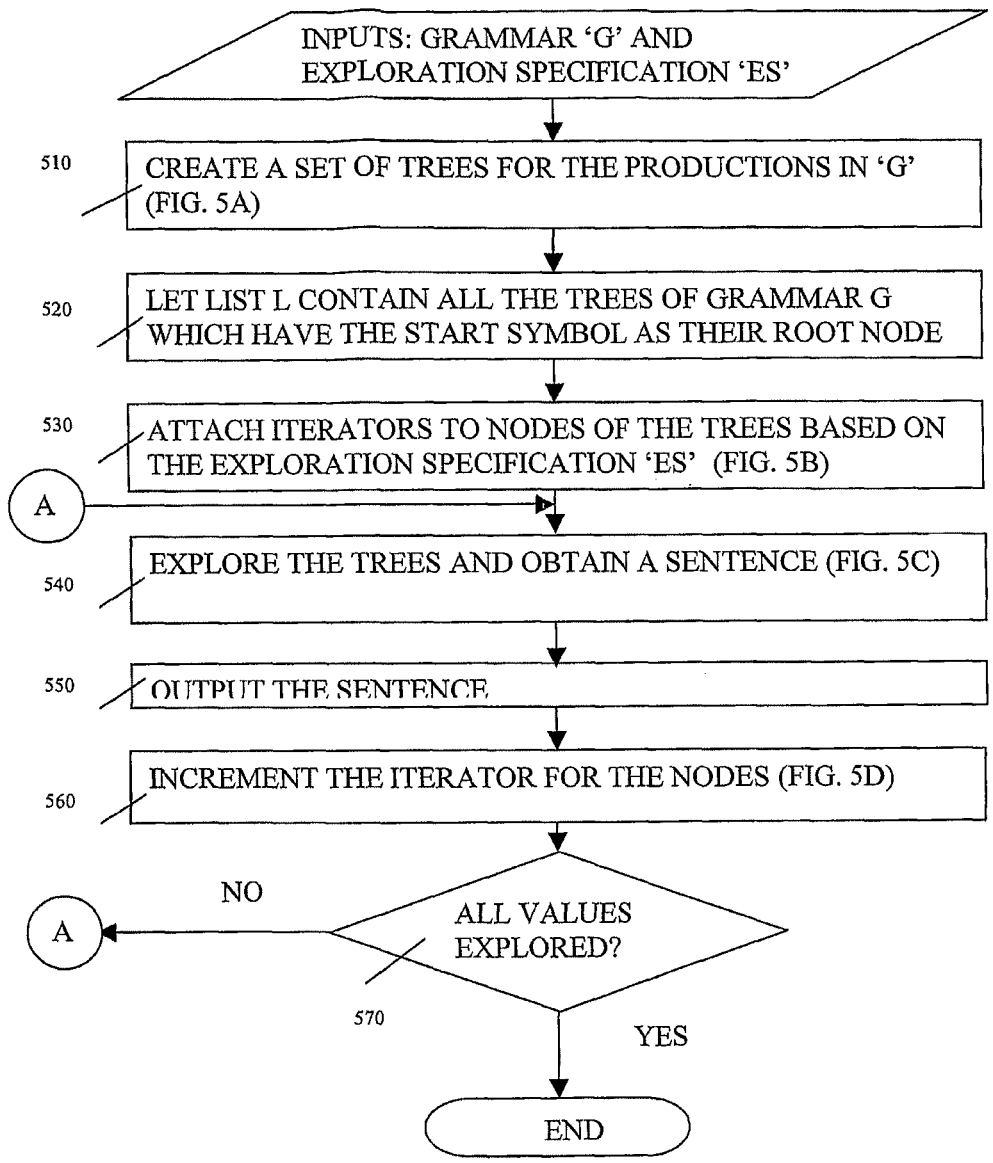

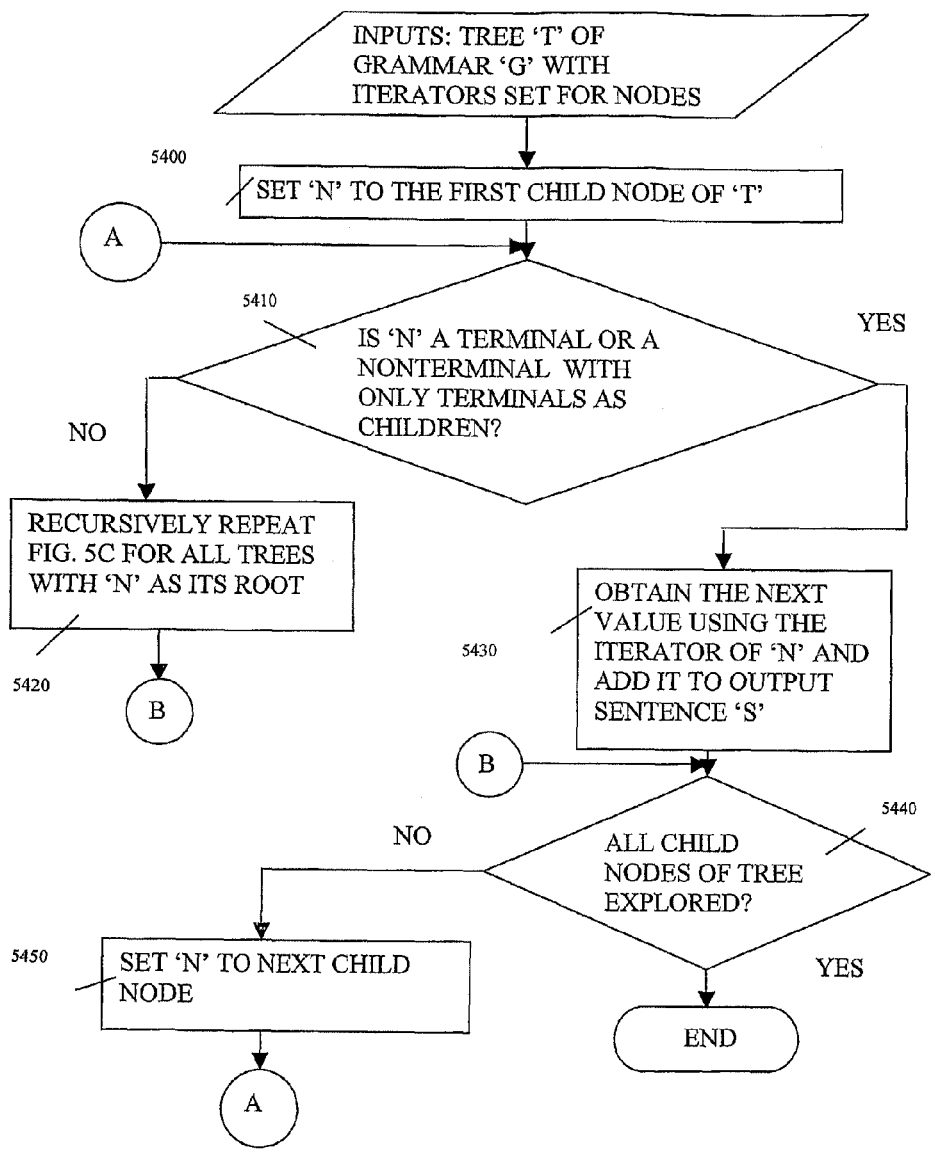

SYSTEM AND METHOD FOR AUTOMATICALLY GENERATING SENTENCES OF A LANGUAGE

FIELD OF THE INVENTION

The present invention relates to the fields of language processing and automatic program generation. The present invention specifically relates to a system and method for automatically generating sentences of a language.

BACKGROUND OF THE INVENTION

In general, a language consists of a set of symbols called its alphabet and a set of rules to form sentences using the symbols. This set of rules is called a grammar of the language, which imposes a structure on the language. The language is normally described by the grammar, where the language and the grammar are denoted by L and G, respectively. The language L can be a natural language, a computer programming language or any other language with a well-defined grammar.

A grammar consists of a set of productions or rewriting rules. This set of productions maps a string of non-terminal and terminal symbols to a non-terminal symbol. The special non-terminal symbol is designated as a START symbol of the grammar. Each production can be represented as a tree structure with the left-hand side non-terminal as the root node and the symbols in the right-hand side of the production as child nodes of the root node. The non-terminal node is recursively expanded to a string containing only terminal symbols by applying different productions of the grammar.

Conventional methods exist to describe a grammar for processing in a computer environment and to check if a set of sentences (or programs) conforms to the grammar. Such methods can act as a basis of program translation tools like compilers, assemblers and also natural language processing systems. A grammar parser is used to check if a set of sentences conforms to the given grammar. A parser is either manually created or automatically generated using tools like, for example, YACC and BISON. A parser accepts a stream of tokens, which can be part of a program written in a programming language, an assembly language statement or a natural language sentence, and the parser can check if the tokens form a valid sentence in the underlying language.

Often, it is required to generate some or all sentences of a language automatically. For example, an automated response system for providing information to users would require generation of specific sentences in English. As another example, it may be required to generate different instruction sequences of a microprocessor to test the behavior of the microprocessor. As a further example, it may be required to generate different DNA sequences as part of a molecular biology experiment. Given a grammar for a language, it is possible to generate all the sentences of the underlying language by starting at the START symbol and repeatedly applying different productions of the grammar. However, it may be required to automatically generate only a subset of the sentences of a language based on a specification of what sentences should be generated. Therefore, it is desirable to provide a system and method for automatically generating sentences of a language in a controlled manner.

OBJECT OF THE INVENTION

An object of the present invention is to provide a system and method for automatically generating sentences of a language in a controlled fashion.

SUMMARY OF THE INVENTION

According to one aspect, the present invention, which achieves this objective, relates to a system for automatic generation of sentences of a language, comprising: a grammar processor for acquiring a grammar specification as input and creating an internal hierarchical representation of the grammar. The hierarchical representation consists of a set of trees corresponding to each production in the grammar. The system also includes a grammar explorer module for exploring the hierarchy of the grammar according to exploration types externally specified in an exploration specification. These exploration types specify which productions should be explored and what values for child nodes of the trees. Such exploration types can explore all child nodes of a node, explore only a specific child node, explore only first value from a list of values for a child node, explore only last value from a list of values for a child node, explore only a selected list of values for a child node and so on. The explorer module attaches iterators to the nodes of each tree according to the exploration specification. The explorer module traverses the hierarchy using the iterator and generates the sentences of the language.

According to another aspect, the present invention, which achieves this objective, relates to a method for automatic generation of sentences of a language, involving: inputting a grammar and an exploration specification, and creating a set of trees for each production in the grammar. The trees of the grammar containing the start symbol as its root node are selected and added to a list. Iterators are attached to the nodes of the tress in the list based on the exploration specification, and the trees are explored using the iterators set in the trees in order to obtain a sentence of the language. The sentence is sent to the output, and the iterators are incremented till all the sentences of the language according to the exploration specification are obtained.

BRIEF DESCRIPTION OF THE DRAWINGS

The invention will be discussed in greater detail with reference to the accompanying Figures.

FIGS. 3A, 3B, and 3C are diagrams illustrating the hierarchical structure of a production for an add instruction in an exemplary assembly language.

FIG. 4 is a diagram illustrating an exploration specification in accordance with an exemplary embodiment of the present invention.

FIG. 5 is a flowchart illustrating a method of automatically generating sentences according to the present invention.

FIG. 5C is a flowchart illustrating the steps of obtaining a sentence from the language using the iterators attached to a tree.

DETAILED DESCRIPTION OF THE INVENTION

Figure 1:
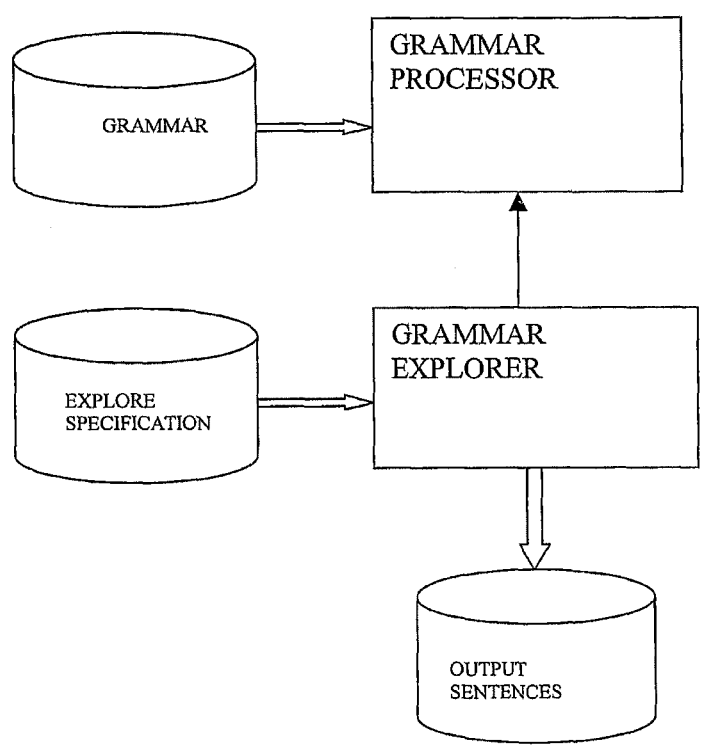
FIG. 1 is a block diagram of a system for automatic generation of sentences of a language in accordance with an exemplary embodiment of the present invention.
Figure 2:
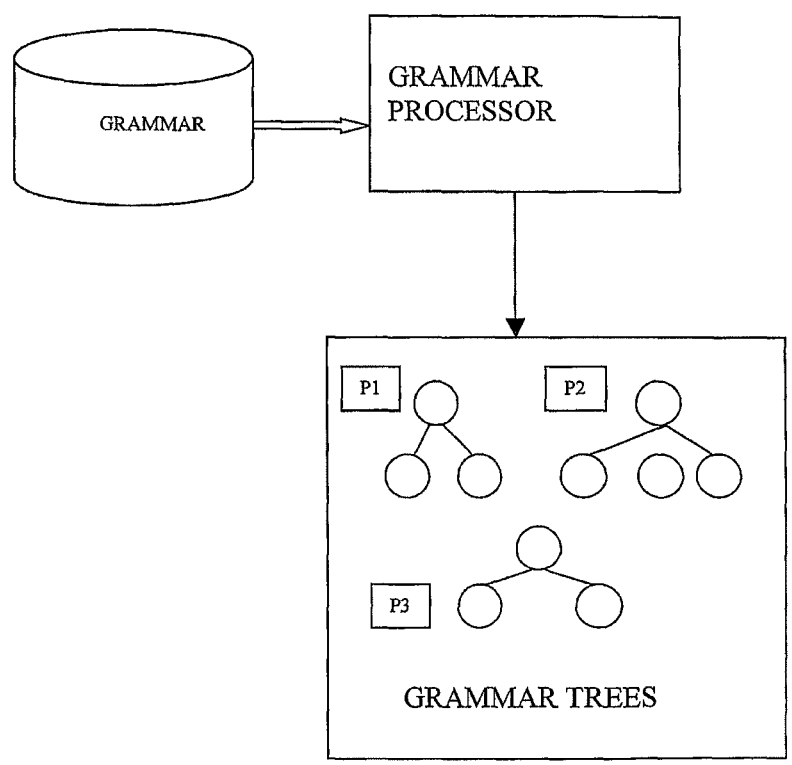
FIG. 2 is a block diagram illustrates a process of creating an internal hierarchical structure from the input grammar in accordance with an exemplary embodiment of the present invention.

An exemplary embodiment of the present invention is illustrated in FIG. 1, which shows a block diagram of a system for automatic generation of sentences of a language. As shown in the figure, the system, includes a grammar processor for acquiring a grammar as input and creating a set of trees for productions of the grammar, as shown in FIG. 2. The system according to the present invention also includes a grammar explorer that is responsible for taking an exploration specification and generating the sentences by exploring the set of trees created by the grammar processor. The exploration specification specifies which nodes of the grammar hierarchy should be explored and for what values. Then, the generated sentences of the language can be outputted.

FIG. 3A shows a set of productions for an add instruction in an exemplary assembly language of a microprocessor. The production P1 contains a non-terminal symbol ADD_INSN in the left-hand side and a list of terminal and non-terminal symbols in the right-hand side—namely, a string of terminal symbols "add", followed by three occurrences of a non-terminal symbol "REG". The productions P2, P3 and P4 in FIG. 3A show that the non-terminal symbol "REG" can be expanded to the terminal symbols "r0", "r1" and "r2", respectively.

FIG. 3B shows an equivalent tree structure for the production P1 shown in FIG. 3A. In FIG: 3B, the root node of the tree is labeled as ADD_INSN that represents the left-hand side non-terminal of the production P1 of the grammar. The root node of the tree includes four child nodes corresponding to the list of terminals and non-terminals in the right-hand side of the production P1. The first child node is a string of terminal symbols, "add". The next three child nodes represent three occurrences of a non-terminal, REG.

FIG. 3C shows the trees corresponding to the productions P2 to P4 of FIG. 3A. In FIG. 3C, each root node of the set of trees is labeled as REG for the productions P2 to P4 of the grammar. Each root node represents the left-hand side non-terminal of the productions P2 to P4, and exhibits a single child node corresponding to the terminal in the right-hand side of the productions P2 to P4. The child nodes of each tree T2, T3 and T4 are represented as r0, r1 and r2, respectively.

Figure 4:
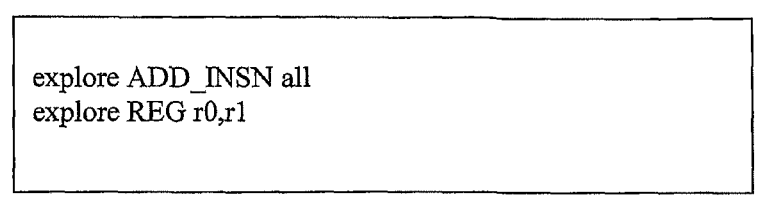

FIG. 4 shows an exemplary exploration specification, by which the nodes of the grammar hierarchy can be explored. The first line of the exploration specification indicates that the node labeled ADD_INSN should be explored fully. That is, all possible sentences should be derived for this node of the grammar hierarchy. The second line of the exploration specification shows that the node labeled REG should be explored only for values r0 and r1. When this exemplary exploration specification is applied to the grammar shown in FIG. 3A, it results in all combinations of the add instruction with r0 and r1 substituted for REG. For example, add r0 r0 r0
  add r0 r0 r1
  add r0 r1 r0
  add r0 r1 r1

Note that the sentences containing 'r2' would not be generated by the grammar explorer for the above case, since the exploration specification allows only the values r0 and r1 for REG.

Figure 5A:
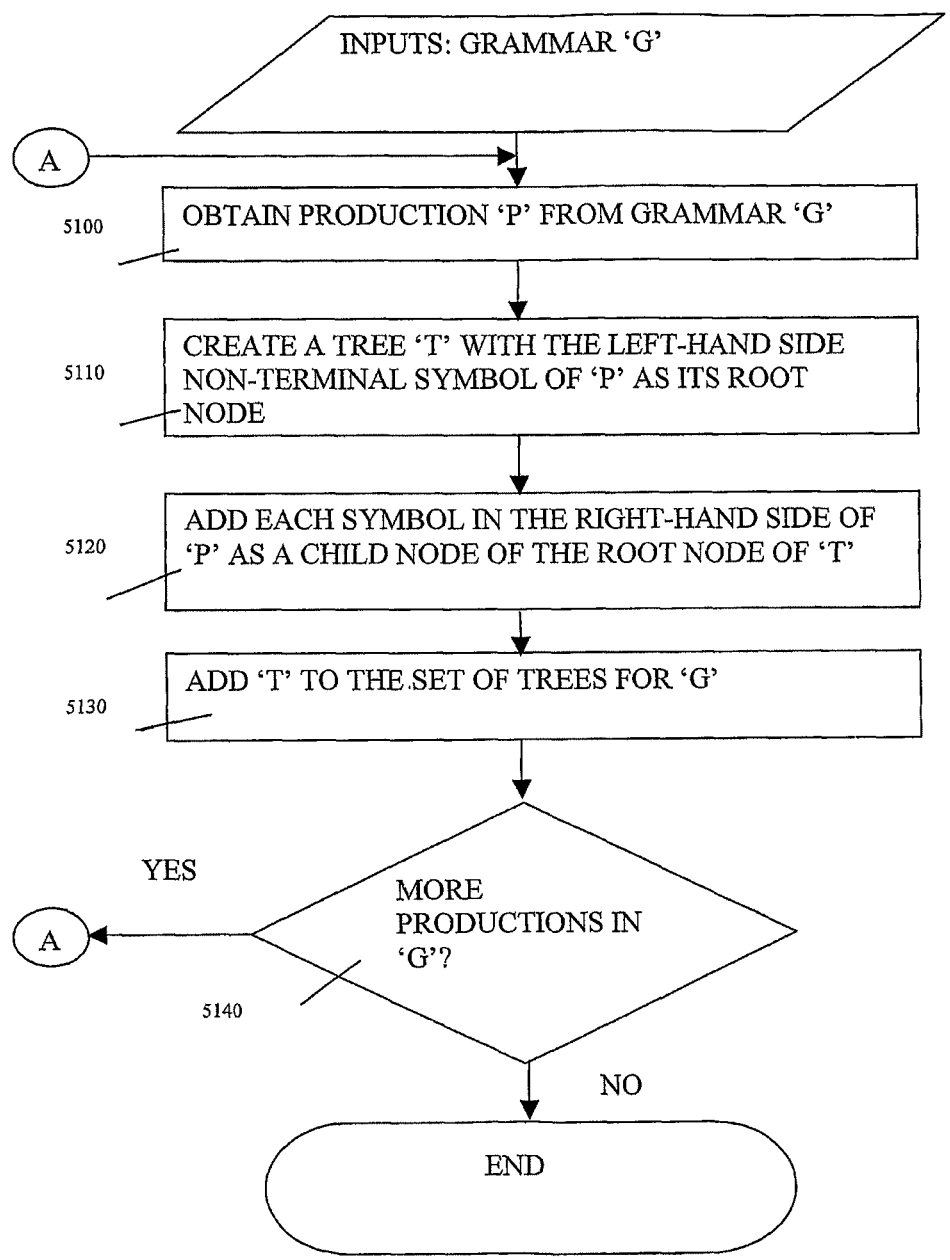
FIG. 5A is a flowchart illustrating the steps involved in creating a set of trees for the productions of the input grammar G.

FIG. 5 illustrates a method according to the present invention for automatically generating sentences of a language. Initially, a grammar G and an exploration specification ES are provided as inputs. In step 510, a set of trees is created by the grammar processor for the input grammar G. This step is explained in detail in FIG. 5A. In step 5100, a production P is obtained from the grammar G. In step 5110, a tree T is created with the left-hand side non-terminal symbol of the production P as its root node. Each symbol in the right-hand side of the production P is added as child nodes of the root node of the tree T, as shown in step 5120. Then, the tree T is added to the list of trees for the grammar G, as illustrated in step 5130. The step 5140 checks if there are more productions in the grammar G. If more productions are present in the grammar G, then, the steps from 5100 to 5140 are repeated until all productions of the grammar G are processed.

Returning to FIG. 5, in step 520, all the trees of the grammar G, which contain the start symbol as its root node, are selected and added to a list L. In step 530, iterators are attached to the nodes of the tress in the list L based on the exploration specification ES. The step 530 is expanded in FIG. 5B. In step 5300, symbol 'N' is set to the root node of the tree T. The step 5310 checks if there is an exploration type for the symbol 'N' in the exploration specification ES. As shown in step 5320, if the exploration type is specified, then, the corresponding iterator I is obtained, where each kind of the exploration type are provided with a different iterator. For example, an iterator for exploring all values for a node can cycle through all possible values for the node, whereas an iterator for exploring only the first value of a node can stop after exploring the first value of the node.

Figure 5B:
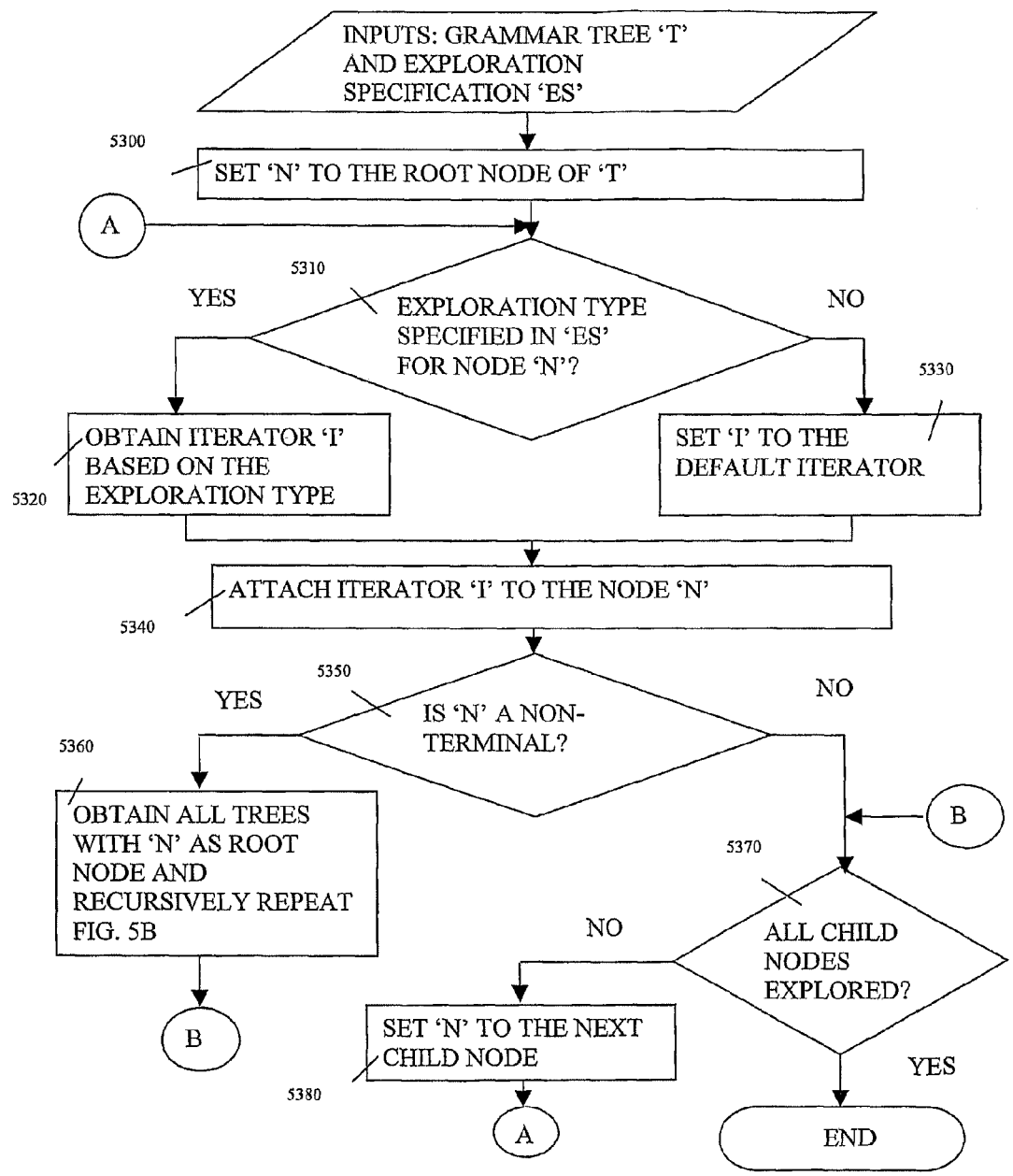
FIG. 5B is a flowchart illustrating the steps of attaching iterators to the nodes of a tree based on an exploration specification.

As shown in step 5330, when no constraint is specified for the node N in the exploration specification ES, then, a default iterator is selected and set as The default iterator either goes through all values or does not explore any values. In step 5340, the iterator I is attached to the node N. The step 5350 checks if the node N is a non-terminal symbol of the grammar G. As illustrated in step 5360, if the node N is the non-terminal symbol, then, all trees with the node N are obtained as its root node. Thereafter, the steps of FIG. 5B are applied to those trees recursively, which results in iterators being attached to all nodes of these trees. Then, the step 5370 checks if all nodes of the tree 'T' are traversed. If not, then, N is set to the next child node, as shown in step 5380, and the steps from 5310 are repeated till all nodes are processed.

Referring to FIG. 5, in step 540, a sentence of the language is obtained from the trees using the iterators set in the tree. This is further explained in FIG. 5C. In step 5400, N is set to the first child node of the tree T. The step 5410 checks if N is a terminal symbol or a non-terminal symbol with only terminal symbols as child nodes. As shown in step 5430, if this condition is true, then, the next value for the node N is obtained using the iterator attached to the node and this value is added to the output sentence. As illustrated in step 5420, if the node N is a non-terminal symbol with other non-terminals as child nodes, then, the steps of FIG. 5C are repeated recursively for the trees with N as its root node. The step 5440 checks if all the child nodes of the tree are explored. If not, then in step 5450, N is set to the next child node of the tree and the steps from 5410 are repeated till all child nodes are processed.

Returning to FIG. 5, in step 550, the sentence obtained in step 540 is sent to the output. In step 560, the iterators attached to the tree are recursively incremented so that the iterators point to the next set of values for the nodes of the tree. This step is further expanded in detail in FIG. 5D. In step 5600 in FIG. 5D, N is set to the first child node of the tree T. The step 5610 checks if all values of the node N are explored, depending on the kind of exploration type specified for the node. For example, if the exploration type allows exploration of all values, then, the check is true when all the values are explored. On the other hand, the exploration type specifies that only the first value should be explored, then, no further values are explored after exploring the first value.

Figure 5D:
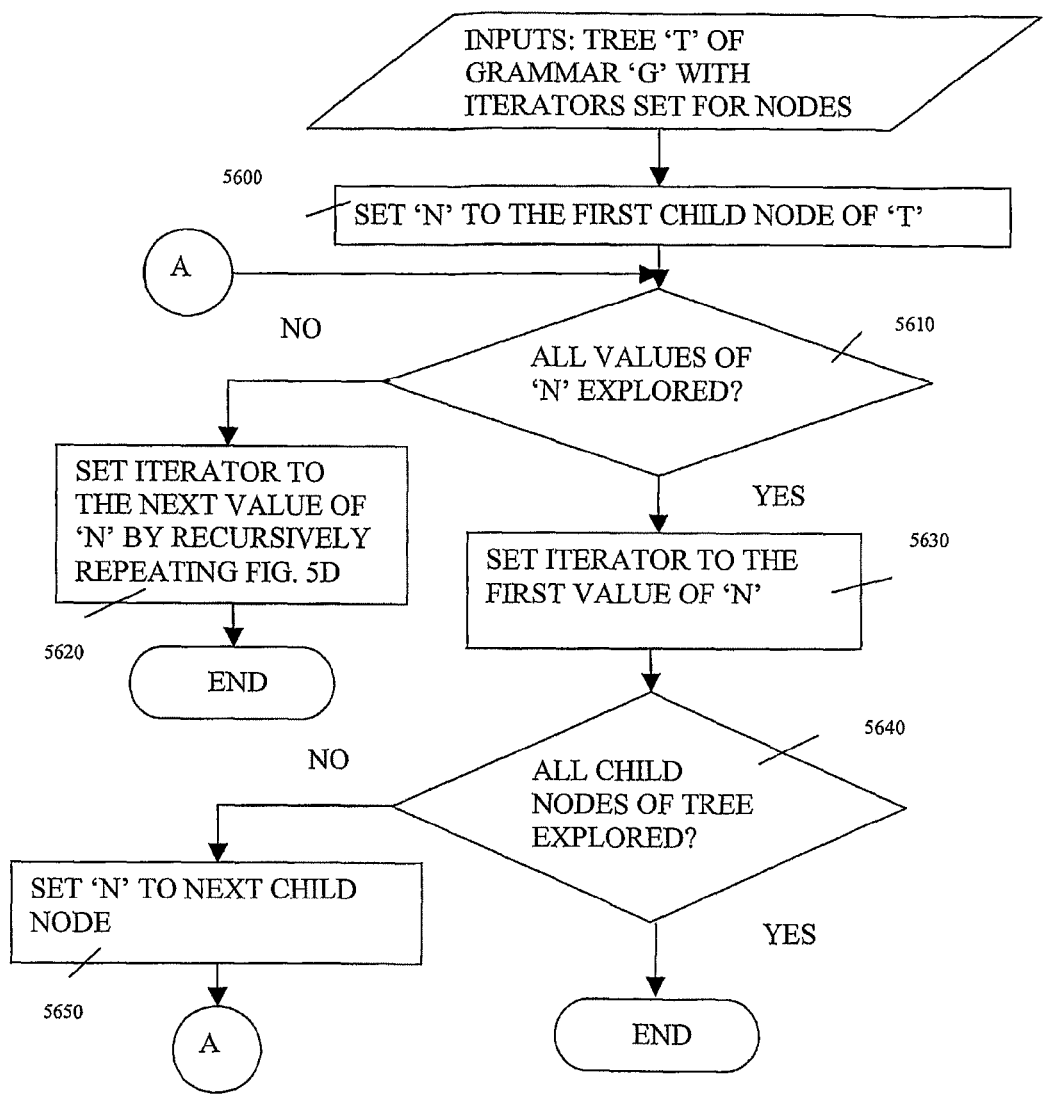
FIG. 5D is a flowchart illustrating the steps involved in incrementing the iterators attached to the nodes of a tree.

In step 5620, the iterator attached to the node N is incremented so that the iterator points to the next value for the node by recursively repeating the steps in FIG. 5D for all trees that exhibit N as its root node. As shown in step 5630, if all values of N are explored, then, the iterator is reset so that the iterator now points to the first value of the node N. The step 5640 checks if all nodes of the tree are traversed. If not, then in step 5650, N is set to the next child node of the tree and the steps from 5600 are repeated until all the child nodes are processed.

Finally, referring to FIG. 5, the step 570 checks if all values of the tree are explored based on the output of the step 560, in which the iterators are incremented. If all values of the tree are explored, then overall execution stops. Otherwise, the steps from 540 are repeated to obtain the next sentence and increment the iterators till all sentences are obtained.

For example, consider the grammar in FIG. 3A to clearly explain the steps of the method according to the present invention. According to step 510 of FIG. 5, the trees T1, T2, T3 and T4 are created for the productions of the grammar as shown in FIG. 3B and FIG. 3C. According to step 520 of FIG. 5, a list L is created with the set of trees that exhibits the start symbol as its root. In this example, assuming that ADD_INSN is the start symbol of the grammar, the list L can contain the tree T1.

Now, as per step 530 of FIG. 5, the iterators are attached recursively to the trees of the grammar according to the exploration specification. Let us assume the exploration specification shown in FIG. 4. According to FIG. 5B, the node for ADD_INSN in the tree T1 is initially taken and it is checked if an exploration type is specified for the node in the exploration specification. As shown in FIG. 4, the exploration type "all" is specified for the ADD_INSN symbol. So, the iterator corresponding to the "all" exploration type is attached to the ADD_INSN node of the tree T1. Then, each child node of ADD_INSN is checked. The first child is a terminal symbol corresponding to the string "ADD". A default iterator is attached to this node. The next child node contains the non-terminal symbol, REG. Now, all trees with REG as the root node are obtained, and the iterator corresponding to the exploration type specified for REG in the exploration specification is attached for each tree.

Next, according to step 540 of FIG. 5, a sentence of the grammar is obtained by exploring the tree T1. As shown in FIG. 5C, the first child node of the tree T1 is taken and checked if it is a terminal or a non-terminal with only terminals as children. In this case, the first node is a terminal node with the string "ADD". For this node, the value is obtained using the iterator attached to the node, which always result in the value "ADD" for the terminal node. Then, the value is added to the output sentence. The next node is a non-terminal REG, which has only terminal nodes as children as shown from the trees T2, T3 and T4. So, the value for this node is obtained from the iterator attached to the node. The first value for REG can be "r0", and then added to the output sentence that now contains the string "ADD r0". The same steps are repeated for the other two child nodes in the tree T1 to obtain the sentence, "ADD r0 r0 r0". This sentence is sent to the output, as illustrated in step 550 of FIG. 5.

Thereafter, in step 560 of FIG. 5, the iterators attached to the tree T1 are recursively incremented so that the iterators point to the next set of values for the nodes. According to FIG. 5D, the first child node of the tree T1 is taken and checked if all values for that node are explored. For the terminal node "ADD", there is only one value, namely, the string "ADD". So, the iterator for this node can be reset, so that the iterator points to the same value. Then, the next child of the tree T1 is checked. This is the node REG for which the iterator is currently set to the value "r0". Then, the iterator is updated so that it now points to the terminal "r1", which is the next value for REG. The iterators of the other nodes are not incremented so that they still point to the previous values.

Now, in step 570, it is checked if more values are present to be explored. If there are more values, the steps from 540 are repeated. Note that the next sentence obtained in step 540 can be the string "ADD r1 r0 r0". This process is repeated till all the sentences according to the exploration specification are explored.

The invention claimed is:

1. A system for automatically generating sentences in a computer programming language, comprising:
   at least one grammar processor for acquiring a grammar as input and creating a grammar hierarchy by converting said grammar into a hierarchical representation, wherein said grammar hierarchy includes a plurality of trees corresponding to a plurality of productions in said grammar; and
   at least one grammar explorer module for acquiring an exploration specification as input and exploring and traversing said grammar hierarchy based on a plurality of exploration types externally specified in said exploration specification, wherein said grammar explorer module generates a plurality of sentences of a language in accordance with said explored and traversed grammar hierarchy.

2. The system of claim 1, wherein said grammar explorer module attaches a plurality of iterators to a plurality of nodes of each tree according to said exploration specification.

3. The system of claim 1, wherein said explorer module traverses said grammar hierarchy using said plurality of iterators in order to generate said plurality of sentences.

4. The system of claim 1, wherein said plurality of iterators explores said plurality of nodes of said grammar hierarchy.

5. The system of claim 4, wherein said plurality of iterators explores a plurality of values for each node of said grammar hierarchy.

6. The system of claim 1, wherein said language includes a grammar defining DNA sequences and a grammar defining music patterns.

7. A method for automatically generating sentences in a computer programming language, comprising the steps of:
   inputting a grammar and an exploration specification, and creating a plurality of trees for a plurality of productions in said grammar;
   selecting and adding said plurality of trees of said grammar to a list of terminal and non-terminal symbols;
   recursively attaching a plurality of iterators to a plurality of nodes of said plurality of trees in said list based on said exploration specification; and
   exploring and traversing said plurality of trees using said plurality of iterators set in each trees in order to obtain a plurality of sentences of a language.

8. The method of claim 7, further comprising:
   sending said plurality of sentences to an output; and
   recursively incrementing said plurality of iterators till said plurality of sentences of said language is obtained entirely.

9. The method of claim 7, wherein said plurality of iterators explores said plurality of nodes of said plurality of trees.

10. The method of claim 9, wherein said plurality of iterators explores a plurality of values for each node of said plurality of trees.

11. The method of claim 7, wherein said language includes a grammar defining DNA sequences and a grammar defining music patterns.

* * * * *